United States Patent [19]
Kemplin

[11] Patent Number: 6,028,941
[45] Date of Patent: *Feb. 22, 2000

[54] METHOD FOR THE DEFEAT OF ILLEGAL DESCRAMBLERS SENSITIVE TO THE EDGES OF SYNC IN SCRAMBLED VIDEO

[75] Inventor: Steven C. Kemplin, Lawrenceville, Ga.

[73] Assignee: Scientific-Atlanta, Inc., Norcross, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/901,531

[22] Filed: Jul. 28, 1997

[51] Int. Cl.$^7$ .................................................. H04N 7/167
[52] U.S. Cl. ............................................ 380/224; 380/221
[58] Field of Search ................................................ 380/15, 5

[56] References Cited

U.S. PATENT DOCUMENTS

| | | | |
|---|---|---|---|
| 3,586,768 | 6/1971 | Ganske | 380/5 X |
| 4,338,628 | 7/1982 | Payne et al. | 380/15 |
| 4,924,498 | 5/1990 | Farmer et al. | 380/15 |

OTHER PUBLICATIONS

"The Upcoming New World of TV Reception", Popular Electronics May 1979 pp. 49–62.

*Primary Examiner*—Pinchus N. Laufer
*Attorney, Agent, or Firm*—Kenneth M. Massaroni; Hubert J. Barnhardt III; Kelly A. Gardner

[57] ABSTRACT

A method for defeating illegal receivers sensitive to the edges of synchronization signals in a scrambled video signal is provided. The scrambled video signal includes synchronization signals having levels which prevent a standard receiver from detecting the synchronization signals by using the levels of the synchronization signals. The synchronization signals also have one or more pulses with level transitions above or below a signal detection threshold level of the standard television receiver which prevent the illegal receivers from detecting the synchronization signals by using the edges of the synchronization signals.

9 Claims, 6 Drawing Sheets

METHOD FOR THE DEFEAT OF ILLEGAL DESCRAMBLERS SENSITIVE TO THE EDGES OF SYNC IN SCRAMBLED VIDEO

BACKGROUND OF THE INVENTION

1. Technical Field

The present invention generally relates to communications systems including remotely located communications terminals and, more particularly, to a method and apparatus for defeating the use of illegal communications terminals in the communications systems.

2. Description of the Related Art

In order to enhance revenues, suppliers of video programming (primarily cable TV systems) offer special programming for which they charge fees. In order for such systems to be profitable, the video signal must be modified so that a standard television receiver will not produce a viewable picture—otherwise no one would pay the extra charge. This is known as video scrambling. The cable system operator then supplies an extra piece of equipment to those who have paid the extra fee. Among other functions, this equipment, known as a set-top terminal (STT), reverses the scrambling process. The "descrambling" results in a viewable picture.

A composite video signal can be viewed as consisting of two types of information, the actual video information and synchronization information ("sync"). The sync can be considered to be further divided into horizontal and vertical sync. The purpose of the sync is to serve as a timing reference so that the TV or other display device can reconstruct the desired image in a viewable form. One horizontal line of normal NTSC video is shown in FIG. 1. It can be seen that the line is characterized by a horizontal sync pulse 101, represented by the sync tip pulse or the most negative state of the video signal. This pulse normally lasts 4.7 microseconds and is repeated 15,734 times each second in the NTSC television system used in the United States and many other countries. Following the sync pulse, the signal voltage returns to the blanking level which is used as a reference value. By common convention, the amplitude of the blanking level is considered to be 0 IRE, a unit of measure adopted by the Institute of Radio Engineers (now the IEEE). The sync tip is at a level of −40 IRE, while peak white is at a level of +100 IRE. This maximum normal excursion of the TV signal of 140 IRE is conventionally equated to 1 volt peak-to-peak, though other voltage levels are sometimes employed internal to a particular piece of equipment. Following the return to a blanking level after a sync tip portion, and after a delay known as the breezeway 102, the color burst 103 occurs. The color burst is composed of eight cycles (nominally) of the color subcarrier, 3.58 MHZ in NTSC transmission. The amplitude, and more importantly, the phase of the color burst are essential to proper recovery of the color information, as is well understood by those in the art. After a delay following the color burst, the active video interval, indicated generally as 107, begins. The time from the end of the sync pulse to the beginning of active video is called the back porch 106. The end of the active video defines the front porch 104, shown twice to emphasize that the signal repeats. The entire interval from the beginning of the front porch to the end of the back porch is collectively known as the horizontal blanking interval (HBI) 105.

The active video interval 107 actually consists of various voltages representing the brightness (luminance) of the image, plus a color subcarrier (not shown) which carries color saturation ("purity") information as amplitude modulation and color value ("tint") represented by its phase with respect to burst 103. This pattern of sync and active video is repeated for 252.5 lines (including vertical blanking). This number of lines constitutes one "field" and is followed by an interleaved second field. The two fields together make up a "frame", or one complete picture. Typically, the frame rate is 30/second, i.e., frames are produced 30 times each second.

A normal television or other video device recovers sync in the following manner. The most negative portion of the waveform is clamped to a known level, and a threshold is established a known distance above the clamp level. The distance above the clamp level is chosen so that video is well above the threshold, while the sync tip is well below the threshold. This is illustrated in FIG. 2.

The most common methods of video scrambling rely on changing the sync levels in the video waveform so that the sync detector circuit in a standard television receiver (or set-top terminal) will be unable to find the sync, thus resulting in an unviewable picture. The video signal has extra information "hidden" in it which allows an authorized STT to determine what must be done to restore the sync to the appropriate levels. This extra information is usually provided as AM modulation on the sound subcarrier or during the vertical blanking interval (VBI) of the composite video signal. The extra information is normally encrypted in some fashion in order to make it more difficult for people to build illegal descramblers (pirate boxes). Examples of systems which rely on changing sync levels for scrambling are shown in U.S. Pat. No. 5,319,709 to Raiser et al. (sync suppression scrambling) and U.S. Pat. No. 4,924,498 to Farmer et al. (video scrambling employing split sync pulses).

Various attempts have been made to develop descramblers for descrambling scrambled video transmissions without payment to the cable operator providing the video transmissions. Recently, a new type of illegal descrambler has been developed which detects the edges of sync signals embedded in scrambled video signals, rather than the levels of these embedded sync signals. Using these detected sync edges, the illegal descrambler generates its own version of a sync signal, which it then reinserts into the video, thereby permitting the scrambled video to be unscrambled. Current scrambling methods which rely on changes in sync levels to prevent unauthorized viewing of scrambled video are ineffective against these pirate boxes which are sensitive to the edges of sync in the video waveform.

SUMMARY OF THE INVENTION

In accordance with the present invention, a method for defeating illegal receivers sensitive to the edges of synchronization signals in a scrambled video signal is provided. The scrambled video signal is generated and includes synchronization signals having levels which prevent a standard receiver (e.g. television or set-top terminal) from detecting the synchronization signals by using the levels of the synchronization signals. The synchronization signals further have one or more pulses with level transitions above or below a signal detection threshold level of the standard television receiver which prevent the illegal receivers from detecting the synchronization signals by using the edges of the synchronization signals. The video signal, including the synchronization signals, is transmitted.

These and other features and aspects of the invention will be more clearly understood from a reading of the following detailed description in conjunction with the appended drawings.

DETAILED DESCRIPTION

While the detailed description below uses NTSC video as an example, it will be appreciated that the concepts contained herein are generally applicable with appropriate modifications to any video system in which sync information is carried in the same signal as video information. Other examples of such video systems are PAL and SECAM. As is known in the art, appropriate standards documents set forth the structure of normal composite video signals, e.g., ANSI/SMPTE 170M for NTSC.

The present invention provides a method and apparatus for generating signals for defeating illegal descramblers which are sensitive to the edges of sync in scrambled video signals. Specifically, the present invention provides for the addition and/or removal of edges from waveforms in order to prevent illegal descramblers which are sensitive to the edges of sync from reconstructing sync. The edges are added and/or removed in a manner which permits normal operation of standard television receivers. This technique will be described in detail below.

Figure 3:
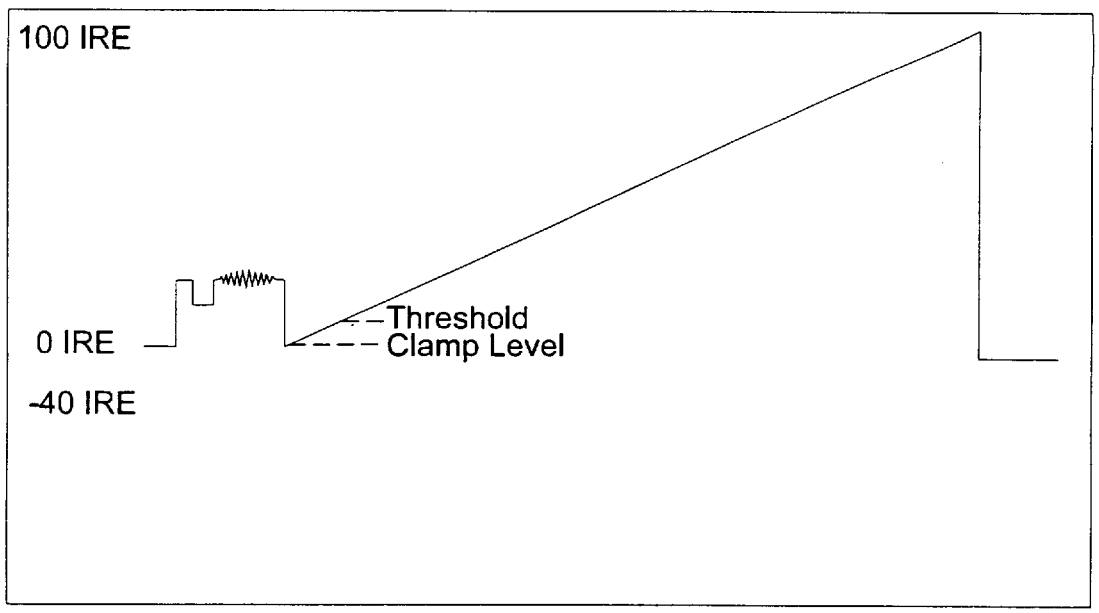
FIG. 3 illustrates a line of a sync suppressed scrambled NTSC video signal.

FIG. 3 illustrates one line of a typical scrambled video signal. As noted above, a standard sync detection circuit as would be used in a standard television would clamp the most negative portion of the waveform of FIG. 3 to a known level and establish a threshold at a certain level above the clamp level. However, as can be seen by the threshold level shown in FIG. 3, the standard sync circuit would attempt to synchronize on part of the video waveform. This results in an unviewable picture. Although sync suppression scrambling is used as an example, the present invention is generally applicable to any method which relies on changing the level of sync information. This includes, but is not limited to, sync suppression, sync inversion, split-sync, etc.

Figure 1:
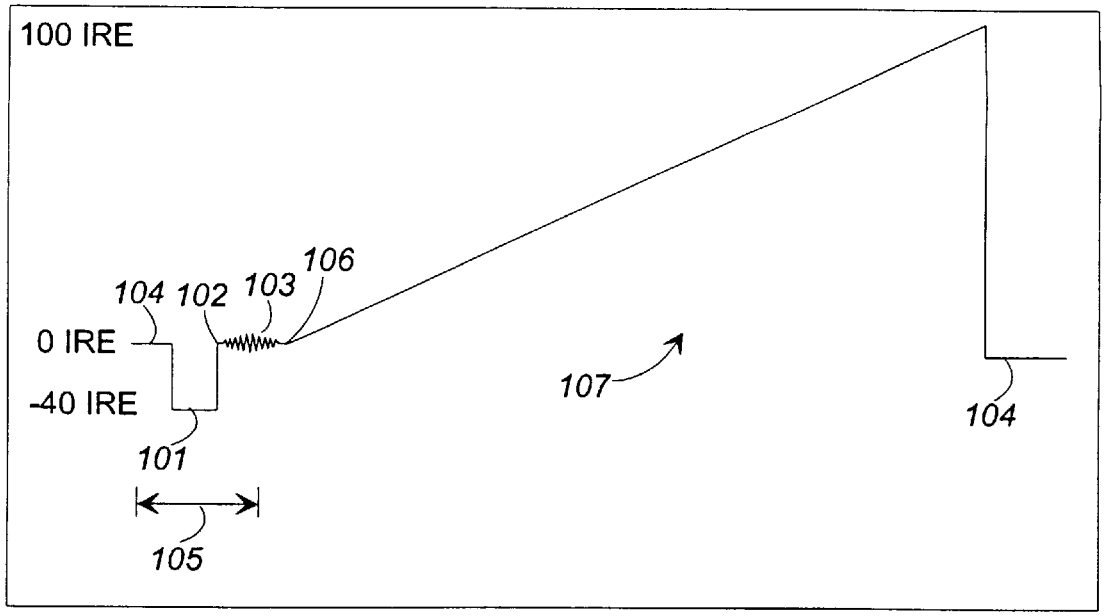
FIG. 1 illustrates a waveform for a line of an NTSC video signal.
Figure 2:
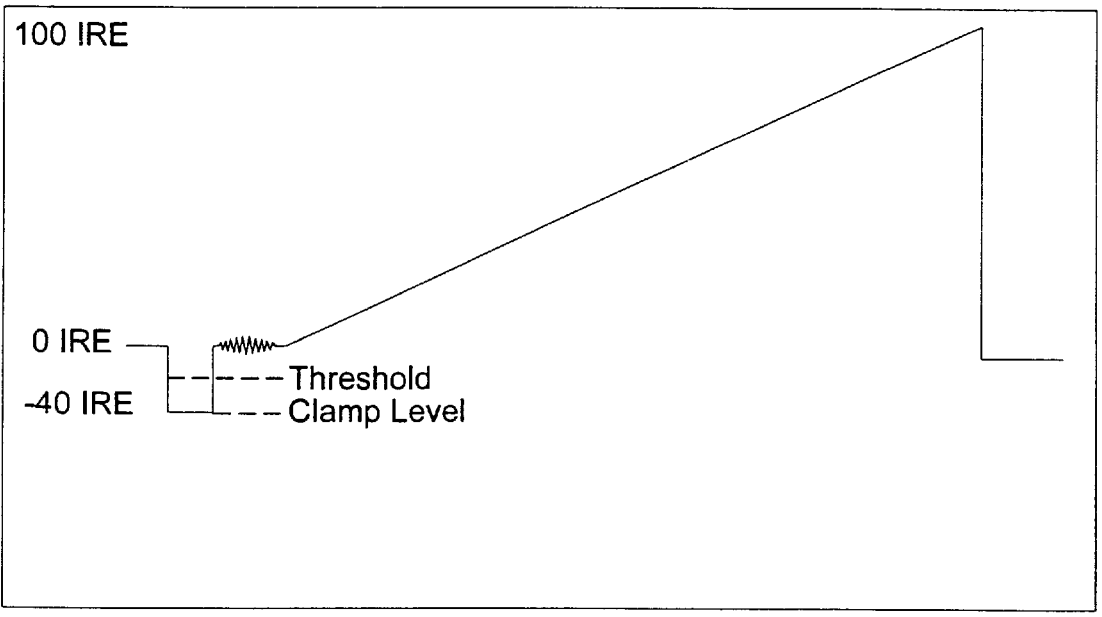
FIG. 2 illustrates the clamping and threshold levels for the NTSC video signal of FIG. 1.

As further noted above, illegal descramblers have recently been developed which operate by attempting to detect the edges of sync hidden in the composite waveform, rather than detecting the sync level. A comparison of the waveforms of FIGS. 2 and 3 shows that the timing of the horizontal sync edges are the same in the normal (unscrambled) and scrambled signals. Thus, an illegal descrambler attempting to detect horizontal sync could, for example, search for an edge in the video waveform, followed by another edge 4.7 microseconds later, followed by another edge 63.5 microseconds after the first edge, and so forth. Upon finding such a pattern, the illegal descrambler could reconstruct horizontal sync.

Figure 4:
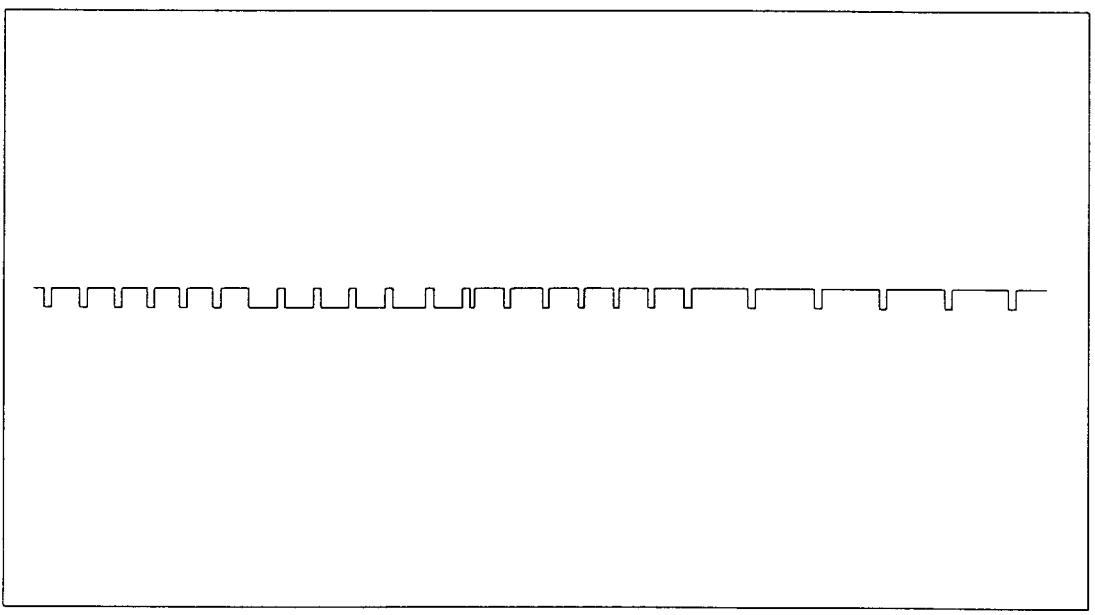
FIG. 4 illustrates a waveform for the vertical blanking interval of an NTSC video signal.
Figure 5:
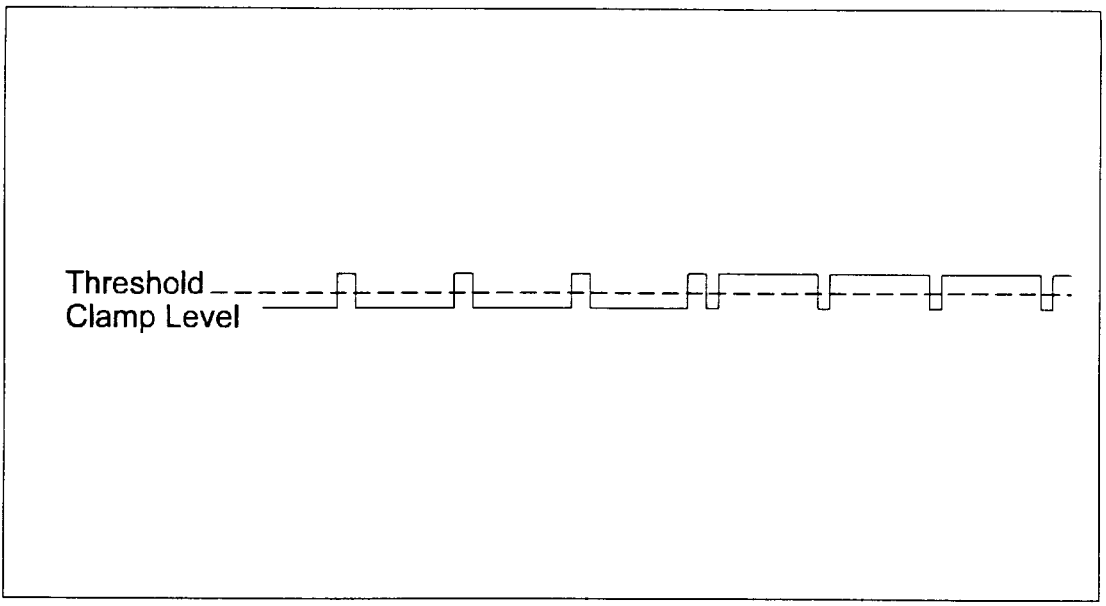
FIG. 5 illustrates an expanded view of a waveform of a particular group of lines of the vertical blanking interval of an NTSC video signal.

A similar approach can be used to regenerate vertical sync. FIG. 4 illustrates a waveform for the VBI for an NTSC system. FIG. 4 illustrates that the lines of vertical blanking interval also include a very well-defined pattern of edges. Thus, an illegal descrambler can search for some pattern of edges during the VBI to establish the beginning of the vertical field. For example, an illegal descrambler might attempt to detect the pattern of edges present on a particular line of a particular field, e.g., line 6 of field two. An expanded view of such a region is shown in FIG. 5.

Figure 6:
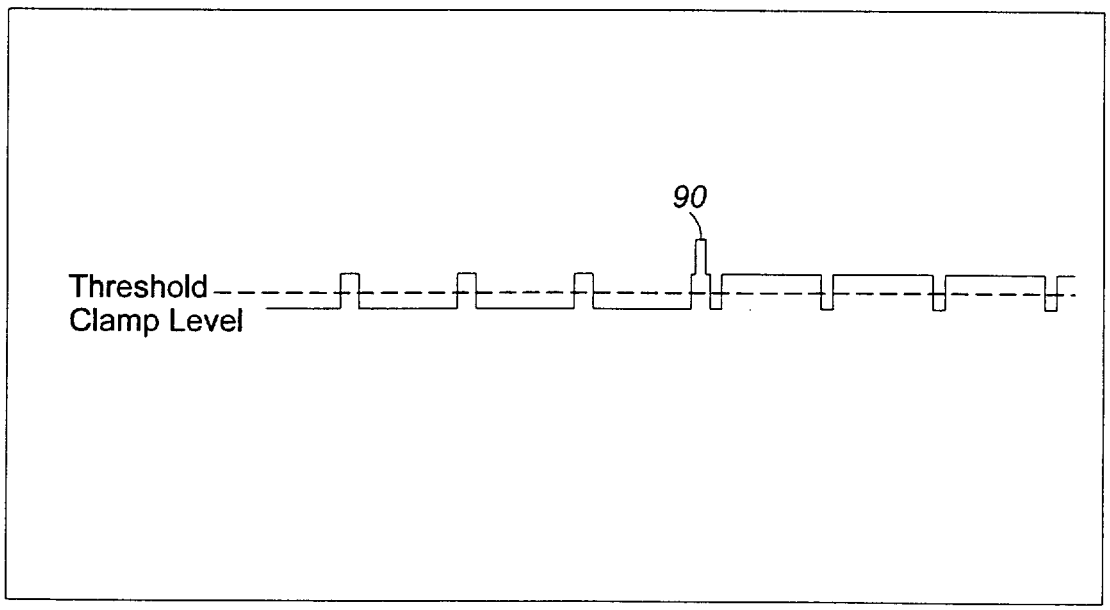
FIG. 6 illustrates one waveform usable for defeating illegal descramblers sensitive to the edges of sync in scrambled video.
Figure 7:
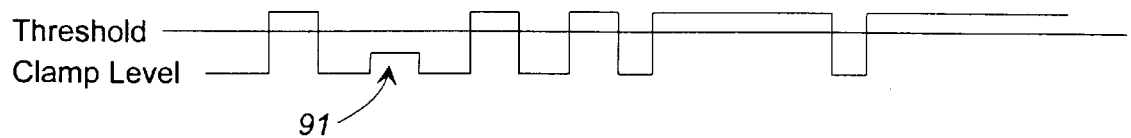
FIG. 7 illustrates another waveform usable for defeating illegal descramblers sensitive to the edges of sync in scrambled video.

As described above, a standard television receiver is sensitive only to whether the sync signal is above the threshold or below it, not how much above or below the threshold the level is. Based on this principle, an additional pulse 90 may be added to the waveform of FIG. 5 as shown in FIG. 6. A standard television receiver will not detect this added pulse, since it does not drop below the threshold level. An illegal descrambler sensitive to pulse edges, however, will detect this added pulse, making it more difficult to detect a pattern for reconstructing sync. By appropriately positioning one or more such added pulses, illegal descramblers can be prevented from reconstructing sync. This, in turn, means that the illegal descrambler will be unable to descramble the scrambled video. Of course, the addition of the pulse to the specific waveform of FIG. 5 is only for illustrative purposes, it should be understood that pulses may be added to any pattern of edges to which a pirate box is sensitive. In general, it is possible to add a pulse to any signal portion having a signal level above the threshold level. (Of course, adding the pulses to video signal portions could corrupt the displayed video, so the pulses would typically be added to non-video signal portions.) It is also possible to add pulses which are below the threshold level provided the pulses do not cross the threshold level as shown in FIG. 7. Specifically, FIG. 7 shows an added pulse 91 which does not cross the threshold level. Again, the particular placement of the pulse or pulses is determined based on the goal of defeating an illegal descrambler which looks for a particular waveform pattern.

It is also possible to add pulses for defeating more than one type of illegal descrambler. That is, pulses can added to the respective patterns of edges to which each of a plurality of different pirate boxes are sensitive.

In addition, the position of the pulses may be varied on a field-by-field or frame-by-frame basis. Thus, for example, the added pulses in one field may be directed to defeating a first type of illegal descrambler while the pulses in another field may be directed to defeating a second type of illegal descrambler. It will of course be appreciated that the position and the number of pulses which must be added to defeat a particular illegal descrambler will be dependent on the characteristics of the illegal descrambler. It will also be appreciated that pulses should be added or removed in a manner which does affect the operation of standard televisions and legal set-top terminals.

Figure 8A:
FIGS. 8(a) and 8(b) illustrate how pulse edges may be removed to defeat illegal descramblers sensitive to the edges of sync in scrambled video.
Figure 8B:
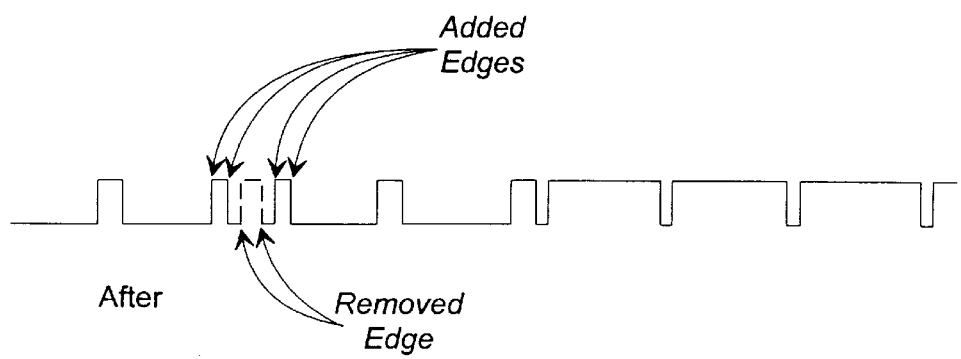

While the above discussion describes the addition of pulse edges to defeat illegal descramblers, it is also possible to remove edges from a waveform in order to defeat an illegal descrambler. In particular, the moving of an edge from its normal position can be viewed as removing one edge and adding another edge in a different location. For example, FIG. 8(a) shows a portion of an NTSC standard vertical blanking interval. Specifically, it shows serration and equalization pulses. If an illegal descrambler were looking for the pattern of edges shown in FIG. 8(a), one way to defeat the illegal descrambler would be to remove one or more of the serration pulses (as shown by the dotted outline pulse in FIG. 8(b)) and replace it with a pair of pulses, each half of the width and symmetrically located before and after the original pulse position as shown in FIG. 8(b). Since most set top terminals and televisions use some variation of the "integrate and threshold compare" method of locating vertical sync, they would not be disturbed by this process since the total area under the pulses remains the same in the "before" and "after" cases. The illegal descrambler, which is looking for a particular pattern of edges, would see four edges in unexpected places, and two missing edges. The illegal descrambler therefore would not find the pattern that it was searching for.

Figure 9:
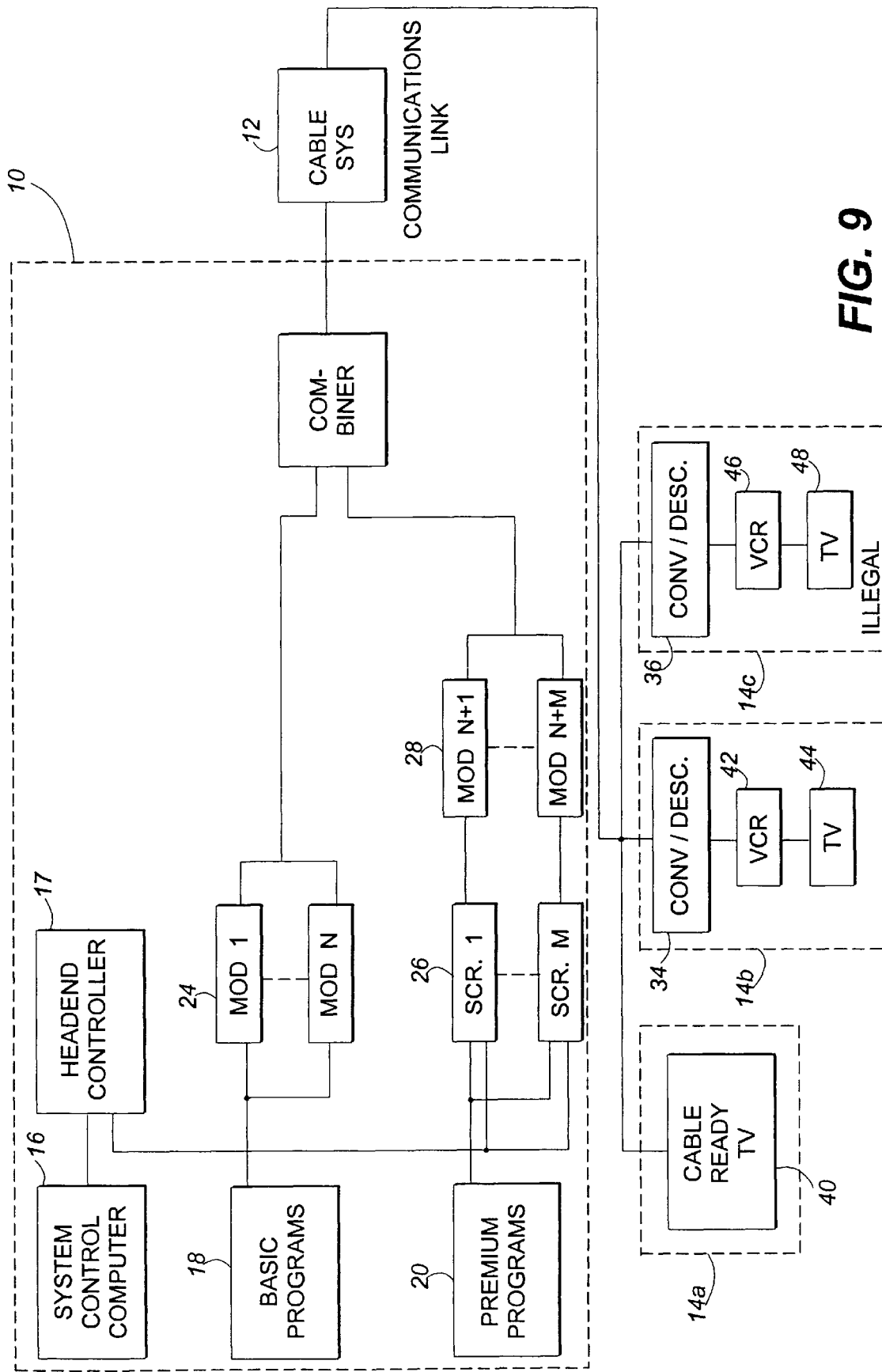
FIG. 9 is a generalized block diagram of a television system in which the present invention may be implemented.

FIG. 9 is a generalized block diagram of a television system in which the method of the present invention may be implemented. The system comprises a headend 10 for transmitting a broadband television signal including television signals on different channels. The broadband television signal includes programming on premium and non-premium channels. The broadband television signal is transmitted over a communications link 12 (such as a CATV system) to a plurality of remote locations 14a, 14b, and 14c. Subscribers pay extra to purchase program on premium channels and a basic service charge to purchase programming on non-premium channels. To deny the premium services to those subscribers who are not authorized to receive them, the programming on premium channels is scrambled. A system control computer 16 controls the overall operation of the television system. Headend controller 17 is responsive to system control computer 16 for generating and supplying data (e.g., authorization data) to scramblers 26 for transmission to remote locations 14a, 14b, and 14c.

Headend 10 of the television system includes a basic program generator 18 and a premium program generator 20. These program generators each provide one or more television channels to modulators 24 and scramblers 26. Program generator 18 provides baseband television signals to each of modulators 24 which convert the signals to assigned channel frequencies. Premium program generator 20 provides baseband television signals to scramblers 26 which scramble the signals. Scramblers 26 may scramble the signals using video inversion, although the invention is not limited in this respect. Scramblers 26 also modulate the IF sound carrier with timing and data pulses for, for example, descrambling the video at the remote locations. Scramblers 26 also add and/or remove sync edges as described above to defeat illegal descramblers present in the communications system. The outputs of scramblers 26 are supplied to modulators 28 which convert the signals to assigned channel frequencies.

The scrambled and non-scrambled channels of the broadband television signal are transmitted to the remote locations 14a, 14b, and 14c. Remote location 14a includes a so-called cable-ready television 40. Remote location 14b includes a legal converter/descrambler 34 which is sensitive to sync levels, a VCR 42, and a television 44. Remote location 14c includes an illegal converter/descrambler 36 which is sensitive to sync edges, a VCR 46, and a television 48. Remote location 14a may only receive the basic programming channels because cable-ready television 40 does not have a means for descrambling. Remote location 14b may receive the basic programming channels, and the premium programming channels because, upon appropriate authorization, converter/descrambler 34 can descramble the scrambled channels using the timing and data pulses transmitted from headend 10. Remote location 14c, however, cannot descramble the scrambled premium channels since, as described above, the added/removed pulses prevent the illegal descrambler from using the sync edges to reconstruct sync.

Figure 10:
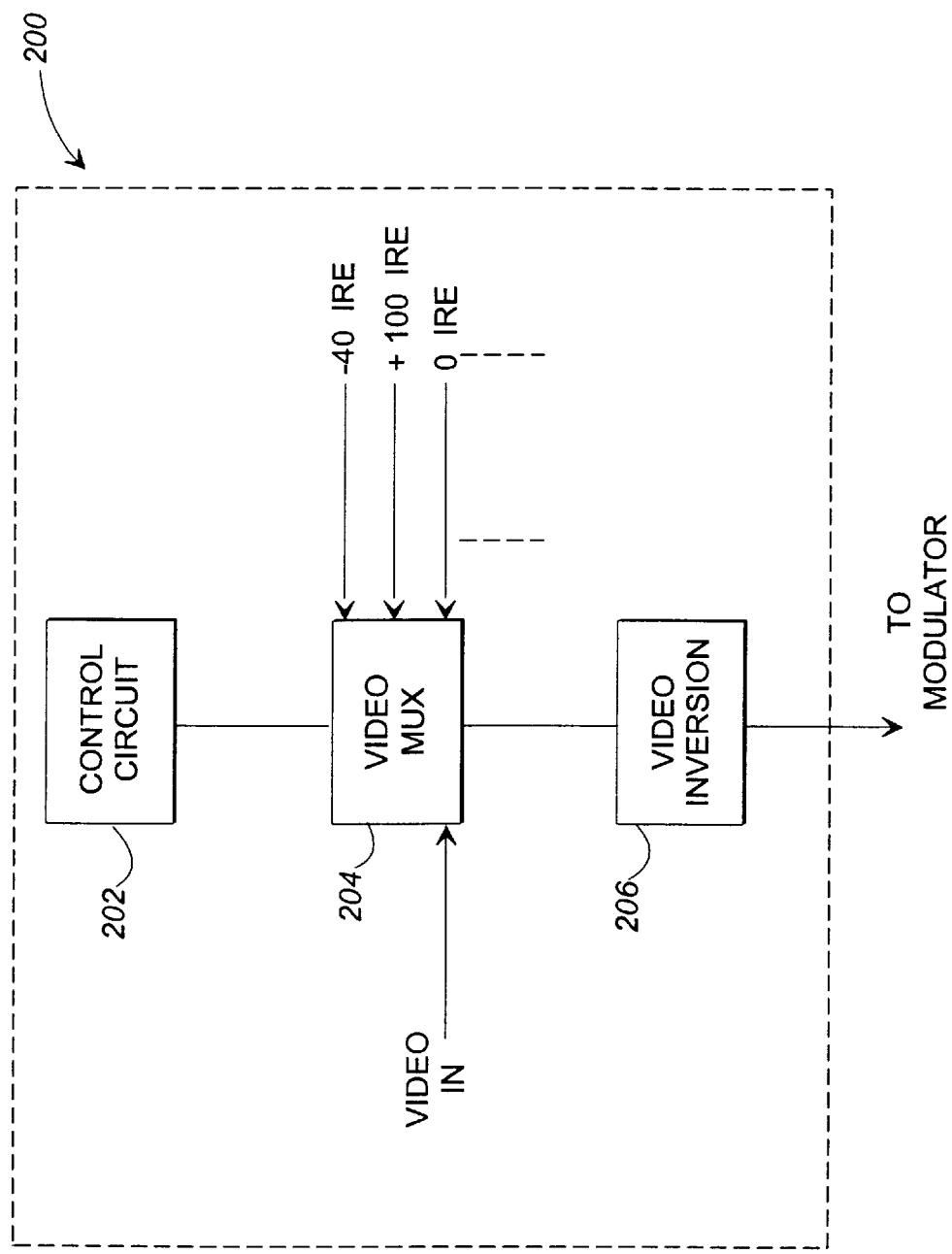
FIG. 10 illustrates circuitry for generating the video signals of the present invention.

FIG. 10 illustrates circuitry 200 suitable for generating the video signals of the present invention. For purposes of this discussion, it will be assumed that circuitry 200 is incorporated as part of a scrambler for scrambling a video signal by video inversion, although the invention is not limited in this respect. Circuitry 200 includes a control circuit 202, a video multiplexer 204, and a video inversion circuit 206. The output of video inversion circuit 206 is supplied to a modulator for modulating the output onto a channel of the television system. Video multiplexer 204 is controlled in accordance with control signals supplied by control circuit 202. Video multiplexer 204 is supplied with a video signal (e.g., a baseband video signal) as well as a plurality of voltage levels, e.g., −40 IRE, 0 IRE, 100 IRE, etc. The control signals control video multiplexer 204 in such a way as to gate any one of the plurality of voltage levels or the video signal for output to video inversion circuit 206. During periods of active video, the control signals cause multiplexer 204 to select the video signal supplied thereto. During other periods (e.g., the horizontal and vertical blanking intervals), the control signals cause multiplexer 204 select from among the various voltage levels in order to insert pulses into the signal supplied to video inversion circuit 206. The control signals from control circuit 202 cause, for example, the waveforms of FIG. 6 or FIG. 7 to be generated. Thus, the voltage levels supplied to multiplexer 204 include voltage levels for generating the added pulses of FIGS. 6 and 7 as described above. Video inversion circuit 206 inverts the signal supplied thereto about some predetermined axis, e.g., 30 IRE (i.e., halfway between the sync tip level of −40 IRE and the peak white level of 100 IRE).

Any patents and publication referred to above are hereby incorporated by reference as to any subject matter deemed essential for an understanding of the present invention.

While there has been shown and described the preferred embodiments of the invention, it will be evident to those skilled in the art that various modifications may be made thereto without departing from the spirit and scope of the invention as set forth in the appended claims.

I claim:

1. A method for defeating illegal receivers that are sensitive to the edges of synchronization pulses in a scrambled video signal, the method comprising the steps of:

generating the scrambled video signal, the scrambled video signal including synchronization pulses having levels which prevent a standard television receiver from detecting the synchronization pulses, adding one or more additional pulses to at least one of the synchronization pulses, wherein the one or more additional pulses do not cross a standard television receiver synchronization signal detection threshold level of the scrambled video signal and do not cross a standard television receiver synchronization signal detection threshold level of an unscrambled video signal that results from unscrambling the scrambled video signal; and transmitting the video signal.

2. The method according to claim 1, wherein the one or more additional pulses are added during the vertical blanking interval.

3. The method according to claim 1, wherein the video signal is an NTSC video signal.

4. The method according to claim 1, wherein the video signal is a PAL video signal.

5. The method according to claim 1, wherein the video signal is a SECAM video signal.

6. A method for defeating illegal receivers that are sensitive to the edges of serration pulses in a vertical synchronization pulses in a vertical blanking interval of a scrambled video signal, the method comprising the steps of:

generating the scrambled video signal;

adding one or more additional pulses to at least one of the serration pulses, wherein the one or more additional pulses do not cross a standard television receiver synchronization signal detection threshold level of the scrambled video signal and do not cross a standard television receiver synchronization signal detection threshold level of an unscrambled video signal that results from unscrambling the scrambled video signal; and transmitting the video signal.

7. The method according to claim 6, wherein the video signal is an NTSC video signal.

8. The method according to claim 6, wherein the video signal is a PAL video signal.

9. The method according to claim 6, wherein the video signal is a SECAM video signal.

* * * * *